(12) United States Patent
Hirooka

(10) Patent No.: US 6,301,086 B1
(45) Date of Patent: Oct. 9, 2001

(54) THIN-FILM MAGNETIC HEAD SUPPORTING STRUCTURE AND METHOD FOR MANUFACTURING THE SAME

(75) Inventor: Taisuke Hirooka, Osaka (JP)

(73) Assignee: Sumitomo Special Metals Co., Ltd. (JP)

( * ) Notice: Subject to any disclaimer, the term of this patent is extended or adjusted under 35 U.S.C. 154(b) by 0 days.

(21) Appl. No.: 09/433,311

(22) Filed: Nov. 3, 1999

(30) Foreign Application Priority Data

Nov. 12, 1998 (JP) .................................................. 10-321730

(51) Int. Cl.⁷ ................................ G11B 5/39; G11B 5/31
(52) U.S. Cl. ........................ 360/317; 360/319; 360/126
(58) Field of Search .................................... 360/317, 319, 360/126

(56) References Cited

U.S. PATENT DOCUMENTS

| | | | |
|---|---|---|---|
| 4,953,051 | * 8/1990 | Wada et al. | 360/126 |
| 5,673,163 | * 9/1997 | Cohen | 360/126 |
| 5,756,201 | * 5/1998 | Kadono et al. | 428/332 |
| 5,795,663 | * 8/1998 | Koike et al. | 428/692 |
| 6,147,843 | * 11/2000 | Yamamoto et al. | 360/313 |

FOREIGN PATENT DOCUMENTS 4-105309 * 4/1992 (JP) .

* cited by examiner

Primary Examiner—David L. Ometz
(74) Attorney, Agent, or Firm—Nixon Peabody LLP; Jeffrey L. Costellia

(57) ABSTRACT

A thin-film magnetic head supporting structure includes: an FeAlSi alloy film; a ceramic substrate used for structural support of the FeAlSi alloy film; and an intermediate multilayer structure disposed between the FeAlSi alloy film and the ceramic substrate. The intermediate multilayer structure includes a Cr film and an Fe film, which are stacked in this order over the ceramic substrate.

18 Claims, 4 Drawing Sheets

THIN-FILM MAGNETIC HEAD SUPPORTING STRUCTURE AND METHOD FOR MANUFACTURING THE SAME

BACKGROUND OF THE INVENTION

1. Field of the Invention

The present invention relates to a structure for supporting a thin-film magnetic head element, a thin-film magnetic head, and a method for manufacturing the supporting structure.

2. Description of Related Art

A magnetoresistive (MR) head comprises a supporting structure with an insulating film such as an alumina film deposited on a ceramic substrate. The ceramic substrate may be made of alumina titanium carbide. In an MR head of this type, a magnetic shield film is deposited on the insulating film. An MR element, a recording head element and so on are formed on the magnetic shield film. The magnetic shield film may be made of a soft magnetic material such as: a permalloy; a Co-based amorphous alloy like a Co—Nb—Zr or Co—Fe—B—Si alloy; and an FeAlSi alloy.

An MR head converts electric variations into magnetic ones, and vice versa, by taking advantage of magnetoresistance unlike an MIG head utilizing electromagnetic induction. Thus, an MR head can reproduce a large voltage without depending on a relative velocity between the head and a recording medium. In recent years, MR heads have been more and more often applied to hard disk drives (HDD) with a large capacity for computers to increase the recording density thereof.

A magnetic shield film for an MR head is required to increase the magnetic permeability thereof at radio frequencies. Specifically, the magnetic shield film needs to exhibit high magnetic permeability at frequencies within a range from about 100 MHz to about 300 MHz. To improve the magnetic permeability of the magnetic shield film, a technique of controlling and uniformizing the in-plane uniaxial magnetic anisotropy thereof over a wide area on a substrate should be developed.

If an FeAlSi alloy film such as a sendust film is used as a magnetic shield film and deposited directly on an insulating film like an alumina film, however, it is possible that the FeAlSi alloy film poorly adheres to the insulating film. In addition, it is difficult to control and uniformize the magnetic anisotropy of the FeAlSi alloy film over a wide area.

SUMMARY OF THE INVENTION

An object of the present invention is providing a thin-film magnetic head supporting structure with an FeAlSi alloy film exhibiting enhanced adhesiveness to a ceramic substrate and well-controlled magnetic anisotropy.

Another object of the present invention is providing a thin-film magnetic head comprising such a supporting structure.

Still another object of the present invention is providing a method for manufacturing the thin-film magnetic head supporting structure.

A thin-film magnetic head supporting structure according to the present invention includes: an FeAlSi alloy film; a ceramic substrate used for structural support of the FeAlSi alloy film; and an intermediate multilayer structure disposed between the FeAlSi alloy film and the ceramic substrate. The intermediate multilayer structure includes a Cr film and an Fe film, which are stacked in this order over the ceramic substrate.

In one embodiment of the present invention, the Fe film is preferably in direct contact with the FeAlSi alloy film and the Cr film, and the thickness of the Fe film is preferably in the range from 20 nm to 500 nm, both inclusive.

In another embodiment, the supporting structure preferably further includes an insulating film between the ceramic substrate and the Cr film.

In still another embodiment, the thickness of the Cr film is preferably in the range from 5 nm to 100 nm, both inclusive.

Another thin-film magnetic head supporting structure according to the present invention includes: an FeAlSi alloy film; a ceramic substrate used for structural support of the FeAlSi alloy film; an insulating film formed on the surface of the ceramic substrate; and an intermediate multilayer structure disposed between the insulating film and the FeAlSi alloy film. The intermediate multilayer structure includes: a metal layer, which is formed in contact with the FeAlSi alloy film for controlling in-plane uniaxial magnetic anisotropy of the FeAlSi alloy film; and an adhesive layer, which is formed between the insulating film and the metal layer and is adhesive to the insulating film more strongly than the metal layer is.

In one embodiment of the present invention, the metal layer is preferably so thick as not to be substantially affected by the adhesive layer on the surface thereof.

A thin-film magnetic head according to the present invention includes: the thin-film magnetic head supporting structure of the present invention; and a magnetoresistive device formed on the supporting structure.

A method according to the present invention is applicable to manufacturing a thin-film magnetic head supporting structure including an FeAlSi alloy film and a ceramic substrate used for structural support of the FeAlSi alloy film. The method includes the steps of: depositing an intermediate multilayer structure on the ceramic substrate; and depositing the FeAlSi alloy film on the intermediate multilayer structure. The step of depositing the intermediate multilayer structure includes: depositing a Cr film on the ceramic substrate; and depositing an Fe film on the Cr film.

In one embodiment of the present invention, the Fe film is preferably deposited to a thickness from 20 nm to 500 nm, both inclusive.

In another embodiment of the present invention, a conductive ceramic substrate with an insulating film formed thereon is preferably used as the ceramic substrate.

In still another embodiment, the Fe film is preferably deposited by sputtering.

DESCRIPTION OF THE PREFERRED EMBODIMENTS

The present inventor formed a Cr film between an FeAlSi alloy film and an undercoat insulating film to improve the adhesiveness of the FeAlSi alloy film to the insulating film and evaluated the magnetic properties of the FeAlSi alloy film. As a result, I found that the in-plane uniaxial magnetic anisotropy of the FeAlSi alloy film was too variable within the wafer plane to control satisfactorily. The degree of in-plane uniaxial magnetic anisotropy is defined by the difference of magnetic permeability values measured in orthogonal directions on the same wafer plane.

Based on this finding, the present inventor modeled a multilayer structure, in which an adhesive layer, an Fe film and an FeAlSi alloy film were stacked in this order on a substrate (or a base plate), and evaluated the magnetic properties of the FeAlSi alloy film. Consequently, I discovered that the in-plane uniaxial magnetic anisotropy of the FeAlSi alloy film can be uniformized over a wide area within the wafer plane by forming the Fe film to a thickness within a predetermined range between the adhesive layer and the FeAlSi alloy film.

Hereinafter, preferred embodiments of a thin-film magnetic head supporting structure and a method for manufacturing the structure will be described with reference to the accompanying drawings.

Figure 1:
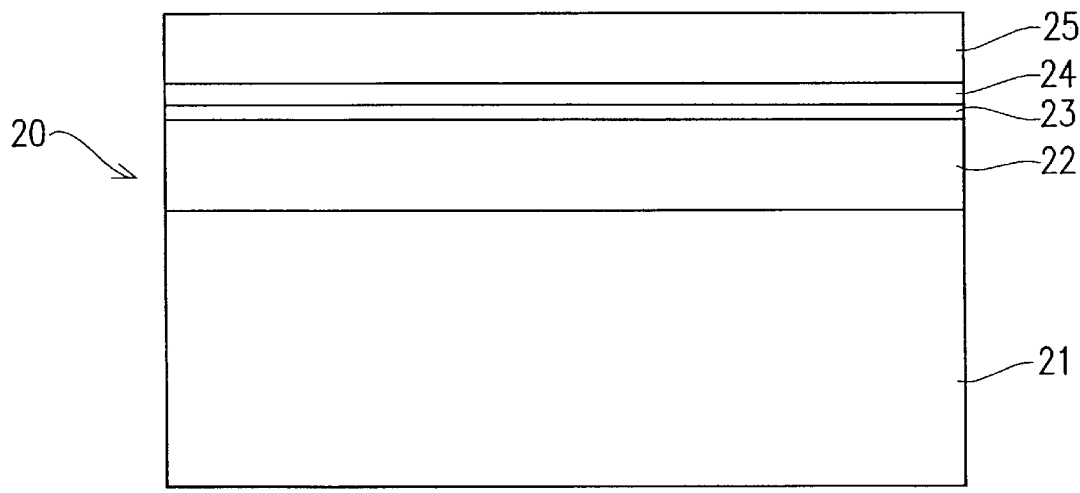
FIG. 1 is a cross-sectional view of a thin-film magnetic head supporting structure according to an exemplary embodiment of the present invention.

FIG. 1 illustrates a cross section of a thin-film magnetic head supporting structure 20 according to an exemplary embodiment of the present invention. In the illustrated embodiment, a conductive ceramic substrate (ceramic plate) 21 with a thickness of 2 mm, which is made of alumina titanium carbide containing 64 wt % of alumina, is used as a wafer. The supporting structure 20 includes: the ceramic substrate 21; an alumina ($Al_2O_3$) film 22 deposited on the substrate 21 to a thickness of 5 $\mu$m; a Cr film 23 deposited on the alumina film 22; an Fe film 24 deposited on the Cr film 23; and an FeAlSi alloy film 25 deposited on the Fe film 24. The contents of Fe, Al and Si in the FeAlSi alloy film 25 are 85.0 wt %, 5.4 wt % and 9.6 wt %, respectively. The FeAlSi alloy film 25 functions as a sendust film.

If the ceramic substrate is made of an insulator, then the upper surface of the ceramic substrate does not have to be covered with an insulating film such as the alumina film 22. However, the surface of the ceramic substrate has a roughness (or smoothness) Ra of 1.0 nm or more. Accordingly, to increase the planarity of the surface, an insulating film such as the alumina film 22 is preferably deposited thereon no matter whether the substrate is conductive or not. By depositing such an insulating film on the surface of the substrate, the planarity of the surface can be increased. According to this embodiment, the surface of the alumina film 22 was buffed and polished, thereby setting the smoothness Ra thereof at 0.5 nm or less. After the polishing, the surface of the insulating film 22 was cleaned with brush and deionized water in high purity to eliminate contamination such as impurity from the substrate as much as possible.

According to this embodiment, the thicknesses of the Cr film 23, Fe film 24 and FeAlSi alloy film 25 were defined at 20 nm, 100 nm and 2 $\mu$m, respectively. All of these metal films 23, 24 and 25 were deposited by a sputtering technique using the same sputtering apparatus and different targets. The sputtering process was performed under the conditions that an RF power of 5.5 W/cm$^2$ was applied, Ar gas was supplied as an ambient gas at a flow rate of 25 sccm and a pressure of 10 mTorr (1.3 Pa) and the substrate was heated up to 200° C. After these films had been deposited by sputtering, the thin-film magnetic head supporting structure 20 was subjected to heat treatment at 480° C. for 60 minutes within vacuum at 5×10$^{-6}$ Torr (6.7×10$^{-4}$ Pa) or less or an inert gas ambient like nitrogen or argon gas.

Figure 2:
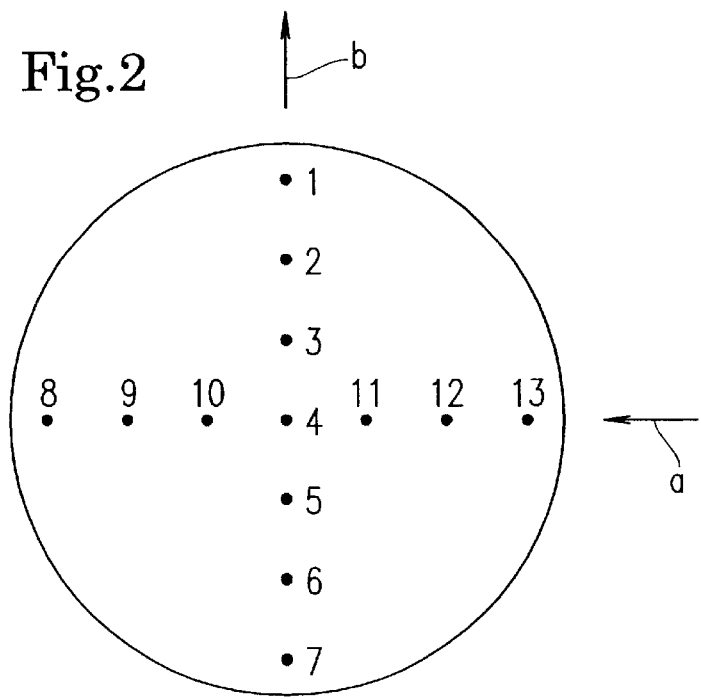
FIG. 2 is a plan view illustrating respective points of a wafer where magnetic properties are evaluated according to the embodiment.

During the sputter deposition of these thin films and the heat treatment conducted after the deposition, the thin-film magnetic head supporting structure 20 was as large as about 125 mm in diameter (see FIG. 2). However, when a thin-film magnetic head is provided as a final product using the supporting structure 20, the structure 20 in the shape of wafer will have been diced into a large number of chips with a size of several millimeters square each. Thus, if the properties of these films are non-uniform within the wafer plane, then the production yield of final thin-film magnetic head products will drop considerably. In contrast, according to this embodiment, since the magnetic properties can be uniformized over a wide area within the wafer, high-quality products can be provided.

Figure 3A:
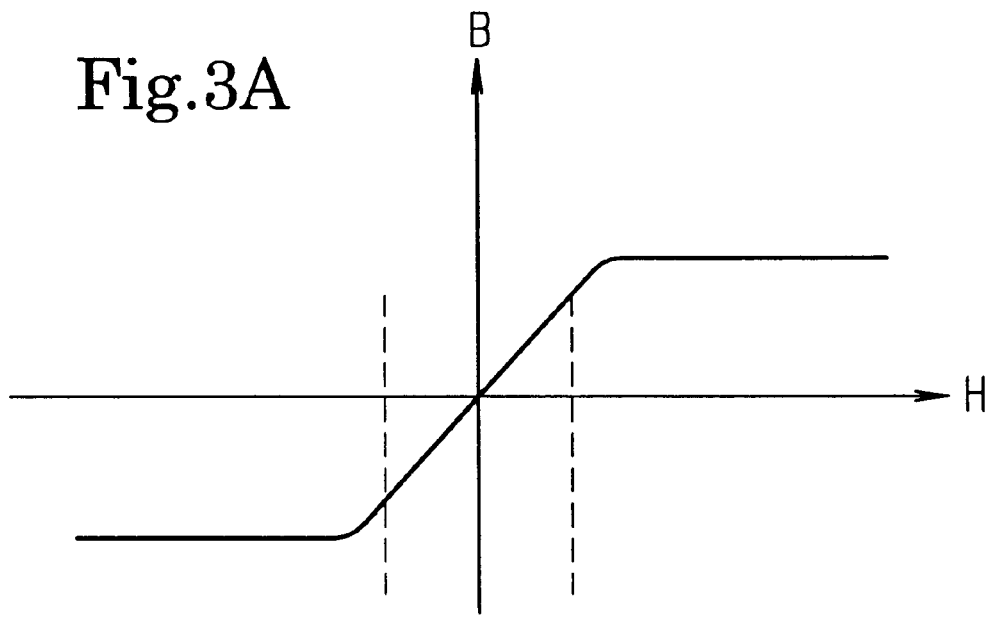
FIGS. 3A and 3B are graphs illustrating magnetic properties evaluated using a micro Kerr effect measuring device according to the embodiment.
Figure 3B:
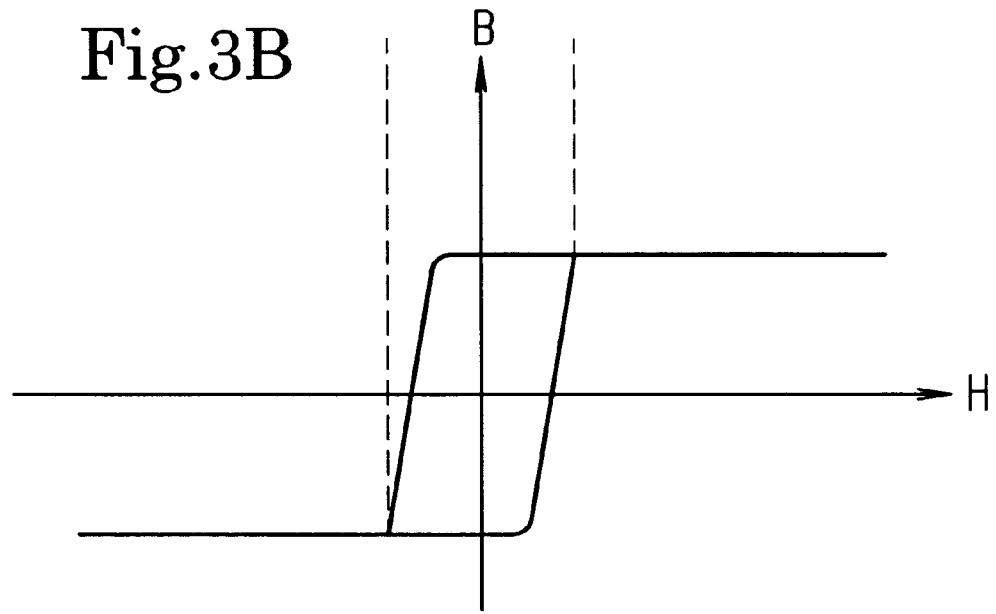

The magnetic properties of the thin-film magnetic head supporting structure 20 were evaluated at respective points 1 through 13 on the wafer using a micro Kerr effect measuring device as shown in FIG. 2. In the illustrated example, the distance between adjacent points was set at 20 mm. Typical examples of the evaluation results are illustrated in FIGS. 3A and 3B. In these graphs, the axis of abscissas represents the magnetic field H, while the axis of ordinates represents the magnetic flux density B. The ordinates are plotted based on the measured angles of Kerr rotation. FIG. 3A illustrates a result of measurement with respect to the hard axis of magnetization as indicated by the arrow a in FIG. 2, while FIG. 3B illustrates a result of measurement with respect to the easy axis of magnetization as indicated by the arrow b in FIG. 2. The magnetic properties shown in FIGS. 3A and 3B were observed at all the measuring points 1 through 13. Thus, it can be seen that in-plane uniaxial magnetic anisotropy was uniformly exhibited at any position on the wafer.

Figure 4:
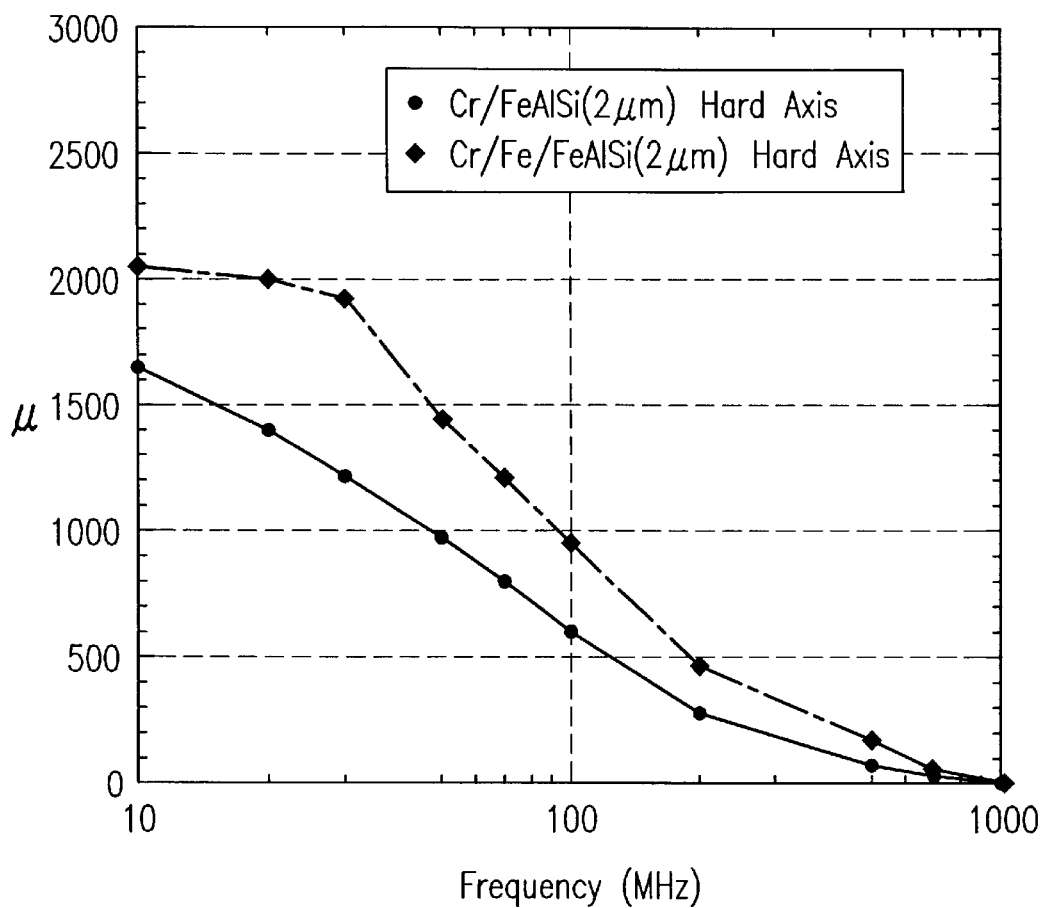
FIG. 4 is a graph illustrating in comparison magnetic permeability at radio frequencies attained in the embodiment of the present invention and that attained in a comparative example.

FIG. 4 illustrates the RF magnetic permeability of this sample. In FIG. 4, the axis of ordinates represents the magnetic permeability $\mu$, while the axis of abscissas represents the frequency. As shown in FIG. 4, higher permeability was attained not only in the frequency range of 100 MHz or less but also in the radio frequency range from 100 MHz to 300 MHz, compared to the prior art.

In the following Table 1, results of evaluated adhesiveness and properties of the Cr film 23 with various thicknesses are summarized. In this case, the "adhesiveness" was evaluated based on the peel strength of the Cr film 23 at which the Cr film 23 started to peel off the alumina film when cut with a grinder, while the "film properties" were evaluated based on a dispersion or variation in the in-plane uniaxial magnetic anisotropy. In evaluating the peel strengths, the degrees of tipping caused by cutting were measured for respective films with various thicknesses. In Table 1, those showing peel strengths qualified for commercial products are identified by open circles. The symbols "○", "Δ", and "X" in the table stand for "good", "not good" and "bad", respectively. A symbol "good" for the "film properties" is given where the sample shows a sufficiently high magnetic permeability in a particular direction.

TABLE 1

| Thickness of Cr [nm] | 0 | 2 | 5 | 10 | 50 | 100 | 200 |
|---|---|---|---|---|---|---|---|
| Adhesiveness | × | Δ | ○ | ○ | ○ | ○ | ○ |
| Film properties | ○ | ○ | ○ | ○ | ○ | Δ | × | where the Fe film is 100 nm thick and the FeAlSi alloy film is 2 μm thick.

To improve the adhesiveness, the thickness of the Cr film 23 is preferably in the range from 5 nm to 100 nm both inclusive. If the thickness of the Cr film 23 exceeds 200 nm, the adhesiveness thereof does not deteriorate so seriously. However, the surface of the Cr film 23 is so roughened as to adversely affect the magnetic properties of the overall stacked structure of metal films. Also, even when the Cr film 23 is relatively thin the Cr film 23 can still improve the adhesiveness. Thus, the Cr film 23 does not have to be so thick. Rather, the Cr film 23 should be as thin as possible to increase the mass productivity.

Next results of evaluated adhesiveness and properties of the Fe film 24 with various thicknesses are summarized in the following Tables 2 and 3. The criteria of evaluation are the same as the case shown in Table 1.

TABLE 2

| Thickness of Fe [nm] | 20 | 50 | 100 | 150 | 200 | 300 | 500 |
|---|---|---|---|---|---|---|---|
| Adhesiveness | ○ | ○ | ○ | ○ | ○ | ○ | ○ |
| Film properties | × | ○ | ○ | ○ | ○ | Δ | × | where the Cr film is 20 nm thick and the FeAlSi alloy film is 2 μm thick.

TABLE 3

| Thickness of Fe [nm] | 20 | 50 | 100 | 150 | 200 | 300 | 500 |
|---|---|---|---|---|---|---|---|
| Adhesiveness | ○ | ○ | ○ | ○ | ○ | ○ | ○ |
| Film properties | × | ○ | ○ | Δ | × | × | × | where the Cr film is 20 nm thick and the FeAlSi alloy film is 1 μm thick.

Both of these samples always exhibited good adhesiveness irrespective of the thickness of the Fe film 24, because the Cr film 23 was deposited under the Fe film 24 to a thickness of 20 nm. To attain the high magnetic permeability in a particular direction, however, the thickness of the Fe film 24 should be 50 nm or more in both of these samples shown in Tables 2 and 3. The upper limit of the preferable thickness range of the Fe film 24 is variable with the thickness of the FeAlSi alloy film 25 deposited thereon. The Fe film 24 should preferably be deposited to be one-tenth or less as thick as the FeAlSi alloy film 25. For example, if the thickness of the FeAlSi alloy film 25 is 2 μm, the upper limit of the preferable thickness range of the Fe film 24 is 200 nm. On the other hand, if the thickness of the FeAlSi alloy film 25 is 1 μm, the upper limit of the preferable thickness range of the Fe film 24 is 100 nm.

As a result of experiments, I found that the Fe film 24 exhibited passable film properties even when the Fe film 24 was 20 nm thick. In addition, I also confirmed that if the thickness of the FeAlSi alloy film 25 was 5 μm or more, the Fe film 24 also exhibited passable film properties even when the Fe film 24 was 500 nm thick. Thus, the thickness of the Fe film 24 is preferably in the range from 20 nm to 500 nm, both inclusive.

In the foregoing embodiment, the variation in in-plane uniaxial magnetic anisotropy of the FeAlSi alloy film is suppressed by using the Fe film. However, any metal film other than the Fe film may also be used instead of, or in addition to, the Fe film, so long as the alternative or additional metal film can suppress the variation in in-plane uniaxial magnetic anisotropy of the FeAlSi alloy film. Also, any metal film other than the Cr film may be used instead of, or in addition to, the Cr film, so long as the alternative or additional metal film exhibits sufficiently high adhesiveness in practice to the undercoat insulating film.

Moreover, in the foregoing embodiment, the thickness of the FeAlSi alloy film 25 is supposed to be 1 or 2 μm. Alternatively, the FeAlSi alloy film 25 may be deposited to any appropriate thickness. If the thickness of the FeAlSi alloy film 25 is less than 1 μm, then the thickness of the Fe film should be in the range from about 20 nm to about 80 nm. This is because if the Fe film is excessively thick and yet the FeAlSi alloy film 25 is relatively thin, then the magnetic properties of the overall stacked structure of metal films are affected by the Fe film too strongly.

In the foregoing embodiment, the contents of Fe, Al and Si in the FeAlSi alloy film 25 are 85.0 wt %, 5.4 wt % and 9.6 wt %, respectively. However, the FeAlSi alloy film according to the present invention is not limited to such a specific composition. Rather, the contents of Fe, Al and Si may be defined at any other appropriate values.

Figure 5:
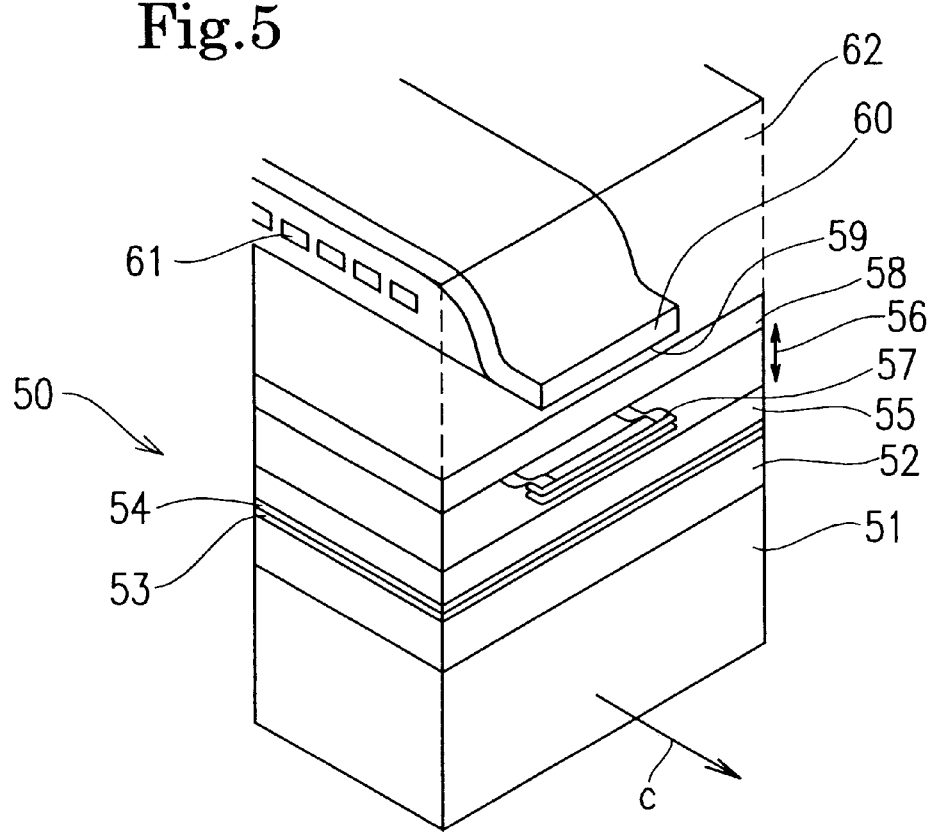
FIG. 5 is a perspective view illustrating a principal portion of a thin-film magnetic head according to an embodiment of the present invention.

Next, an embodiment of a thin-film magnetic head according to the present invention will be described with reference to FIG. 5. FIG. 5 is a perspective view illustrating a principal portion of the thin-film magnetic head 50.

The thin-film magnetic head 50 according to this embodiment includes: a ceramic substrate 51 made of alumina titanium carbide; an alumina insulating film 52 deposited on the substrate 51 to a thickness of 3 to 15 μm; a Cr film (adhesive layer) 53 deposited on the insulating film 52; an Fe film 54 deposited on the Cr film 53; and an FeAlSi alloy film 55 deposited on the Fe film 54. The contents of Fe, Al and Si in the FeAlSi alloy film 55 are 85.0 wt %, 5.4 wt % and 9.6 wt %, respectively. The FeAlSi alloy film 55 functions as a sendust film. According to this embodiment, the thicknesses of the Cr film 53, Fe film 54 and FeAlSi alloy film 55 are defined at 27 nm, 100 nm and 2 μm, respectively. The hard magnetization axis of the FeAlSi alloy film 55 is defined as a direction indicated by the arrow c in FIG. 5.

A gap 56 of about 0.4 μm is provided over the FeAlSi alloy film 55. A reproducing MR device 57 is placed within the gap 56. The MR device 57 has a known construction including electrodes and films (not shown). The gap 56 is provided within an insulating film, which is made of alumina, for example, and deposited on the FeAlSi alloy film 55 to cover the MR device 57. The thickness of the MR device 57 is about 0.1 μm, for example.

A bottom pole 58 (thickness: 2 to 3 μm) is deposited on the insulating film including the gap 56. The bottom pole 58 is made of a soft magnetic material such as a permalloy, and also functions as a magnetic shield film. A top pole 60 (thickness: 2 to 3 μm) is formed over the bottom pole 58 with a write gap 59 of 0.4 to 0.6 μm interposed therebetween. A coil pattern 61, which is formed by patterning a Cu film with a thickness of about 5 μm, is provided between the bottom and top poles 58 and 60. The coil pattern 61 is covered with an organic insulating film. A recording head section is made up of the bottom pole 58, coil pattern 61 and top pole 60. By energizing the coil pattern 61, a magnetic field is formed in the vicinity of the write gap 59, and data is written (recorded) onto a recording medium (not shown). The recording head section is covered with an overcoat (thickness: 40 μm, for example).

These multilayer structures may be formed by ordinary thin-film deposition and lithography techniques. In this embodiment, the Cr, Fe and FeAlSi alloy films 53, 54 and 55 are deposited by sputtering. Alternatively, these films may be formed by any other thin film deposition technique.

This thin-film magnetic head 50 includes a multilayer structure similar to the thin-film magnetic head supporting structure 20 under the MR device 57. Accordingly, the FeAlSi alloy film 55 has the uniaxial magnetic anisotropy thereof controlled by the Fe film 54 and exhibits improved RF magnetic permeability. In addition, since the adhesiveness of the FeAlSi alloy film 55 has been enhanced by the Cr film 53, there is no concern about peeling of the FeAlSi alloy film 55.

In the foregoing embodiment, the present invention has been described as being applied to a ceramic substrate made of alumina titanium carbide. According to the present invention, however, other ceramic substrates may also be used. In this specification, a glass substrate is also included in the category of "ceramic substrates". This is because the effects of the present invention are attainable to a sufficient degree even with a glass substrate.

Also, the reproducer formed over the magnetic shield film is not limited to the MR device, but may be any other device.

The present invention provides (1) a thin-film magnetic head supporting structure that can improve not only the adhesiveness of an FeAlSi alloy film to a ceramic substrate but also the RF magnetic permeability of the FeAlSi alloy film by controlling the in-plane uniaxial magnetic anisotropy thereof, and (2) a thin-film magnetic head formed on such a supporting structure.

In addition, according to the present invention, even when the FeAlSi alloy film is deposited over a wide area of a wafer, the in-plane uniaxial magnetic anisotropy thereof can be uniformized within the wide wafer plane. As a result, a great number of thin-film magnetic heads can be manufactured at a good yield and at a lower cost.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A structure for supporting a thin-film magnetic head thereon, the supporting structure comprising:
    an FeAlSi alloy film;
    a ceramic substrate used for structural support of the FeAlSi alloy film; and
    an intermediate multilayer structure disposed between the FeAlSi alloy film and the ceramic substrate,
        wherein the intermediate multilayer structure includes a Cr film and an Fe film, which are stacked in this order over the ceramic substrate.

2. A thin-film magnetic head supporting structure according to claim 1, wherein the Fe film is in direct contact with the FeAlSi alloy film and the Cr film, and
    wherein the thickness of the Fe film is in the range from 20 nm to 500 nm, both inclusive.

3. A thin-film magnetic head supporting structure according to claim 1 or 2, further comprising an insulating film between the ceramic substrate and the Cr film.

4. A thin-film magnetic head supporting structure according to claim 3, wherein the thickness of the Cr film is in the range from 5 nm to 100 nm, both inclusive.

5. A thin-film magnetic head supporting structure according to claim 1 or 2, wherein the thickness of the Cr film is in the range from 5 nm to 100 nm, both inclusive.

6. A structure for supporting a thin-film magnetic head thereon, the supporting structure comprising:
    an FeAlSi alloy film;
    a ceramic substrate used for structural support of the FeAlSi alloy film;
    an insulating film formed on the surface of the ceramic substrate; and
    an intermediate multilayer structure disposed between the insulating film and the FeAlSi alloy film,
        wherein the intermediate multilayer structure includes
        a metal layer, which is formed in contact with the FeAlSi alloy film for controlling in-plane uniaxial magnetic anisotropy of the FeAlSi alloy film, and
        an adhesive layer, which is formed between the insulating film and the metal layer and is adhesive to the insulating film more strongly than the metal layer is.

7. A thin-film magnetic head supporting structure according to claim 6, wherein the metal layer is so thick as not to be substantially affected by the adhesive layer on the surface thereof.

8. A thin-film magnetic head comprising:
    a supporting structure; and
    a magnetoresistive device formed on the supporting structure,
    wherein the supporting structure includes:
        an FeAlSi alloy film;
        a ceramic substrate used for structural support of the FeAlSi alloy film; and
        an intermediate multilayer structure disposed between the FeAlSi alloy film and the ceramic substrate,
    wherein the intermediate multilayer structure includes a Cr film and an Fe film, which are stacked in this order over the ceramic substrate.

9. A thin-film magnetic head according to claim 8, wherein the Fe film is in direct contact with the FeAlSi alloy film and the Cr film, and
    wherein the thickness of the Fe film is in the range from 20 nm to 500 nm, both inclusive.

10. A thin-film magnetic head according to claim 8 or 9, further comprising an insulating film between the ceramic substrate and the Cr film.

11. A thin-film magnetic head according to claim 8 or 9, wherein the thickness of the Cr film is in the range from 5 nm to 100 nm, both inclusive.

12. A thin-film magnetic head comprising:
    a supporting structure; and
    a magnetoresistive device formed on the supporting structure,
    wherein the supporting structure includes:
        an FeAlSi alloy film;
        a ceramic substrate used for structural support of the FeAlSi alloy film;
        an insulating film formed on the surface of the ceramic substrate; and
        an intermediate multilayer structure disposed between the insulating film and the FeAlSi alloy film,
        wherein the intermediate multilayer structure includes
        a metal layer, which is formed in contact with the FeAlSi alloy film for controlling in-plane uniaxial magnetic anisotropy of the FeAlSi alloy film, and
        an adhesive layer, which is formed between the insulating film and the metal layer and is adhesive to the insulating film more strongly than the metal layer is.

13. A thin-film magnetic head according to claim 12, wherein the metal layer is so thick as not to be substantially affected by the adhesive layer on the surface thereof.

14. A method for manufacturing a thin-film magnetic head supporting structure including an FeAlSi alloy film and a ceramic substrate used for structural support of the FeAlSi alloy film, the method comprising the steps of:

depositing an intermediate multilayer structure on the ceramic substrate; and depositing the FeAlSi alloy film on the intermediate multilayer structure, wherein the step of depositing the intermediate multilayer structure includes depositing a Cr film on the ceramic substrate, and depositing an Fe film on the Cr film.

15. A method according to claim 14, wherein the Fe film is deposited to a thickness from 20 nm to 500 nm, both inclusive.

16. A method according to claim 14 or 15, wherein a conductive ceramic substrate with an insulating film formed thereon is used as the ceramic substrate.

17. A method according to claim 16, wherein the Fe film is deposited by sputtering.

18. A method according to claim 14 or 15, wherein the Fe film is deposited by sputtering.

* * * * *